United States Patent
Pinheiro De Figueiredo et al.

(10) Patent No.: US 9,965,050 B2
(45) Date of Patent: May 8, 2018

(54) INTERACTIVE BOOK ELECTRONIC SYSTEM AND OPERATION METHOD THEREOF

(71) Applicant: UNIVERSIDADE DO MINHO, Braga (PT)

(72) Inventors: Ana Carina Pinheiro De Figueiredo, Trofa (PT); Ana Lúcia Jesus Pinto, Matosinhos (PT); Pedro Sergio Oliveira Branco, Guimarães (PT); Nelson Troca Zagalo, Braga (PT)

(73) Assignee: UNIVERSIDADE DO MINHO, Braga (PT)

( * ) Notice: Subject to any disclaimer, the term of this patent is extended or adjusted under 35 U.S.C. 154(b) by 80 days.

(21) Appl. No.: 14/784,390

(22) PCT Filed: Apr. 16, 2014

(86) PCT No.: PCT/IB2014/060761
§ 371 (c)(1),
(2) Date: Oct. 14, 2015

(87) PCT Pub. No.: WO2014/170840
PCT Pub. Date: Oct. 23, 2014

(65) Prior Publication Data
US 2016/0070366 A1 Mar. 10, 2016

(30) Foreign Application Priority Data

Apr. 16, 2013 (PT) .......................... 106896

(51) Int. Cl.
*G06F 3/0346* (2013.01)
*G09B 5/06* (2006.01)
*G06F 3/0483* (2013.01)

(52) U.S. Cl.
CPC .......... *G06F 3/0346* (2013.01); *G06F 3/0483* (2013.01); *G09B 5/062* (2013.01)

(58) Field of Classification Search
CPC .... G06F 3/0346; G06F 3/0483; G06F 3/0224; G06F 3/0238; B42D 1/007; B42D 3/123; G09B 5/06; G09B 5/062
(Continued)

(56) References Cited

U.S. PATENT DOCUMENTS 5,707,240 A * 1/1998 Haas ...................... B42D 3/123
434/308
5,709,409 A * 1/1998 Engel ...................... B42D 3/02
281/27.3

(Continued)

FOREIGN PATENT DOCUMENTS

GB 2466268 A * 6/2010
JP S-5697136 8/1981

(Continued)

OTHER PUBLICATIONS

J. Steimle, Pen-and-Paper User Interfaces, Human-Computer Interaction Series, Springer (2012), 202 pages.

*Primary Examiner* — Vinh T Lam
(74) *Attorney, Agent, or Firm* — Leason Ellis LLP

(57) ABSTRACT

Interactive electronic system having a screen and a three-axis compass sensor for detecting flipping of pages of a book, wherein the book comprises a plurality of pages, each having with one or more magnets, and wherein the system is arranged to detect the flipping of pages of the book by the data readings of the value of one axis, X, Y, or Z; or the magnitude of the calculated vector of the values of the axes X, Y, and Z. Also a method of interaction comprises: downloading the software of the book to the electronic device; putting the book which contains the sensors in a pre-determined area near the electronic device in manner to (Continued)

identify the pages; calibrating the system; obtaining the values of the magnitude of the magnetic field by the compass sensor to detect the page that is open; displaying the corresponding digital content in synchronization.

18 Claims, 4 Drawing Sheets

(58) Field of Classification Search
USPC .......... 345/156; 434/309, 317; 281/29, 15.1; 235/375, 440
See application file for complete search history.

(56) References Cited

U.S. PATENT DOCUMENTS

| | | | | |
|---|---|---|---|---|
| 5,820,383 | A * | 10/1998 | Levins | A63F 9/34 273/157 R |
| 6,064,855 | A * | 5/2000 | Ho | G09B 5/062 345/901 |
| 6,763,995 | B1 * | 7/2004 | Song | G06F 3/0224 235/375 |
| 6,865,367 | B2 * | 3/2005 | Kim | B42D 3/123 345/901 |
| 2003/0048250 | A1 * | 3/2003 | Boon | G06F 3/016 345/156 |
| 2003/0116620 | A1 * | 6/2003 | Song | G06F 3/0224 235/375 |
| 2003/0170604 | A1 * | 9/2003 | Mullen | B42D 1/007 434/317 |
| 2004/0023200 | A1 * | 2/2004 | Blume | G06F 3/03545 434/317 |
| 2005/0052015 | A1 * | 3/2005 | Hynek | B42D 1/006 281/15.1 |
| 2005/0053906 | A1 * | 3/2005 | Kim | G09B 5/062 434/317 |
| 2005/0260551 | A1 * | 11/2005 | Rubin | G06F 15/0283 434/317 |
| 2008/0268415 | A1 * | 10/2008 | Kwong | G09B 5/062 434/317 |
| 2008/0268416 | A1 | 10/2008 | Wallace | |
| 2009/0021318 | A1 * | 1/2009 | Lin | G09B 5/062 331/117 R |
| 2010/0167258 | A1 | 7/2010 | Ravizza | |
| 2011/0037245 | A1 * | 2/2011 | Kairey | B42D 3/12 281/15.1 |
| 2011/0111382 | A1 * | 5/2011 | Binyamin | G09B 5/062 434/317 |
| 2011/0133441 | A1 * | 6/2011 | Kaufman | A63H 33/38 281/29 |
| 2012/0112448 | A1 * | 5/2012 | Lo | B42D 1/001 281/15.1 |
| 2012/0200487 | A1 * | 8/2012 | Dvorak | G06F 3/0483 345/156 |
| 2013/0002543 | A1 * | 1/2013 | Yau | B42D 3/123 345/156 |

FOREIGN PATENT DOCUMENTS

| | | |
|---|---|---|
| JP | 2010/266911 | 11/2010 |
| WO | WO-0111588 | 2/2001 |
| WO | WO-2009/136390 | 11/2009 |

* cited by examiner

INTERACTIVE BOOK ELECTRONIC SYSTEM AND OPERATION METHOD THEREOF

CROSS-REFERENCE TO RELATED APPLICATIONS

This application is a U.S. National Stage Application under 35 U.S.C. § 371 of International Patent Application No. PCT/IB2014/060761, filed Apr. 16, 2014, which claims priority to Portuguese Patent Application No. 106896, filed Apr. 16, 2013, the contents of which are hereby incorporated by reference in their respective entireties.

TECHNICAL FIELD

The present disclosure relates to a system and operation method thereof, comprising a physical book with magnets on the pages that controls an electronic interactive device through its compass sensor, such as a tablet or a smartphone.

SUMMARY

The present disclosure relates to a system and a method for illustrating animations, interactive elements, sound effects, or in general any digital content, through interaction of the user. More particularly, the present disclosure relates to a method for illustrating images, text and sound using a book that transmits information to an electronic device that presents further information than the one that is in the book.

The disclosure comprises a physical book with magnets on the pages that controls a electronic device with a compass sensor, such as tablet or smartphone, and a method by which a software running on the device reads the values from the compass sensor and detects the page the book is open in. The software running on the device can trigger text, images, animations, interactive elements, sound effects, or in general any digital content, in response to the page of the physical book.

The result is a combination between a book artefact and a digital device whose purpose is the exploration of narrative contents through interaction and synchronization between both media; the contents are related or complementary between the book and the digital interface.

This disclosure can be applied to magazines, journals, brochures and other page-based supports that allow placement of the magnets, however the term "book" will be used to refer to all those materials.

Nowadays one of the most widespread cross-culturally artefact is the book and since its birth it have evolved technically and conceptually. Over the years, electronic and digital possibilities, combined with the traditional printed books, resulted in interesting experimental mixed media books that increased the expressive possibilities of traditional printed books.

Paper supports a wealth of interactions that have a number of inherent advantages over digital technologies, both hands can interact with it and "get tactile-kinesthetic feedback" and in a book is possible to sense "the appropriate number of remaining pages with one finger" (Steimle, 2012. *Pen-and-Paper User Interfaces: Integrating Printed and Digital Documents*, Springer). The digital media have also advantages: it can include audiovisual and interactive media.

The disclosure consists on a physical book with a magnet placed in each page to be used in conjunction with smartphones, tablets and other devices with a built-in digital compass, and a software, installed on the device, that reads the page on which the book is open and displays related content.

The software detects the page the book is open by reading from the compass sensor the strength of the magnetic field induced by presence of the magnets. It then triggers digital content on the device in response to that page. This is achieved by placing a magnet with a known magnetic force on each page, and designing the book in such way that when a page is flipped, the magnet moves away from the compass sensor, causing a change on the magnetic field. Since the force of each magnet is known, the software on the device, reading the magnitude of magnetic field from the compass sensor, can determine the number of magnets near the sensor, and therefore the number of pages open (FIG. 1—Process of magnets interaction with tablet). The strength of the magnetic field is obtained from the raw readings of the compass-sensor values. Various methods can be applied: the compass-sensor data readings per each axis (X, Y, Z) is used, and the magnitude of that vector calculated, or in alternative, for faster computation, only the value of one axis of the compass sensor is used (FIG. 5—Data collected—Measures magnitude from each axis: X, Y and Z).

In a simpler approach, only the value of one axis of the compass sensor is used. The axis is selected establishing how the book is to be placed in respect to the device, by previously knowing therefore the position and orientation of the compass sensor in respect to the magnets on the book and selecting the axis aligned with the magnet polarization. In another approach, based on an initial calibration process, the compass-sensor axis that has the stronger variation when flipping the pages is selected (FIG. 5—Data collected—Measures magnitude from each axis: X, Y and Z). As an example, in FIG. 5, the Z-axis exhibits the most variation when flipping the book pages. The magnetic reading on each axis will normally depend on the alignment of the magnets polarization in respect to the device sensor. If, for instance, the device is operated tilted in respect to the book, a different axis—say, axis X—could present the most variation, being that axis selected to determine the number of pages open.

The best location for the magnets on the page depends on the book physical configuration and on how it is designed to be used with the device, for example the book can overlap the device or can be placed next to it (FIG. 4—Alternative layout of magnets, book and tablet location). The magnets location on the page should be such that it allows the magnets to move ideally from the closest distance to the device compass sensor to the furthest away from the sensor to provoke the maximum change on the magnetic field when flipping the pages.

The magnets can have various strengths, depending on the number of pages, and the distance between the magnets and the compass-sensor, as long as the sensor is able to detect significant differences on the magnetic field between pages. The magnet strength must be strong enough to allow the sensor reading and small enough not to saturate the sensor. The magnets are fixed to the page, by different techniques, for example placing the magnet within a cut-out in the page, attaching it directly to the surface of the page, among others.

Since the exact readings of the compass sensor may vary depending on the environment and the position and/or distance of the book to the device, the software application performs initially a calibration process. This calibration consists of placing the book closed, near the device and reading a baseline value of the magnitude of the magnetic field, preferably if the device is to be placed in a known manner in respect to the book. Previous recorded values of the compass-sensor readings for each page, for different distances, are included in the software and serve as reference values. Based on that data and the baseline compass-sensor readings, the software estimates the distance of the book and estimates the magnetic readings for each of the book page open.

If the device can be oriented and positioned close enough but in a relatively free manner in respect to the book, the calibration process may be triggered displaying a message asking the user to slide the device around the book (or vice-versa) finding the best position corresponding the maximum magnitude of the sensor readings. Having the position established, the compass axis to be used to detect the pages that is dependent on the orientation of the device. The axis may be selected by having the user flipping one or more pages and detecting the axis, or axis combination, with strongest variation.

The sensor readings are stable and reliable if there are no other external interferences of high magnetic forces and the pages are correctly identified if the book remains sensibly within the same place after the initial calibration site. For correct sensing, the book must stay inside a particular pre-determined area that allows to each page be identified. The distance of the book to the device is conditioned by the strength of the magnets used on the pages.

The digital compass sensor on the tablet and other devices is typically meant to serve a particular goal: assist navigation and location aware applications. For that purpose, and to improve the functioning of the sensor, devices such as smartphones and tablets may implement an interference detection and recalibration method. When the device detects a significant amount of magnetic interference from a nearby magnetic field, it initiates a process of recalibration, and this functionality interferes with our approach. This functionality should be disabled automatically by the software, or in alternative, when not possible, if the device recalibration process is triggered during the use of the book, the user it requested to go back to the calibration process or inform the software of the current page location.

It is disclosed an interactive electronic system having a screen and a three-axis compass sensor for detecting flipping of pages of a book,
  wherein the book comprises a plurality of pages, each
    having with one or more magnets,
  and wherein the system is arranged to detect the flipping
    of pages of the book by the data readings of the value
    of one axis, X, Y, or Z; or the magnitude of the
    calculated vector of the values of the axes X, Y, and Z.

In an embodiment, the magnet location on a book page is such as to, when flipping a book page, the magnet moves from the closest distance to the furthest away from the compass sensor, in order to provoke the maximum change on the magnetic field.

In an embodiment, the magnets are included within the thickness of each page.

In an embodiment, the number of magnets corresponds to the number of pages that are to be identified by the system.

In an embodiment, the thickness of the magnets is the same as the thickness of the page.

In an embodiment, the system is arranged such that when the compass sensor senses the change on the magnetic field of flipping a book page, then the information that is presented in the screen is also changed.

In an embodiment, the magnet is located on the book back cover, book front cover or any single page of the book.

In an embodiment, the electronic system is a tablet or a touch-screen device.

It is described a method of operating any of the interactive systems as described, comprising:
  a) downloading the corresponding software of the book to the electronic device;
  b) the book, which contains the magnets, having been put in a pre-determined area near the electronic device such that to identify the flipping of pages;
  c) calibrating the system;
  d) obtaining the values of the magnitude of the magnetic field by the compass sensor of the electronic device to detect which page of the book is open;
  e) displaying the corresponding digital content in synchronization with the open page.

In an embodiment, the position of the book is left, right, above or on top of the electronic device.

In an embodiment, the electronic device is in landscape relative to the system user and the book is above or below it.

In an embodiment, the calibration comprises reading a baseline value of the magnitude of the magnetic field by the compass sensor and including previously recorded values of the compass-sensor readings for each page, for different distances, in the software to serve as reference values.

In an embodiment, the magnitude of the magnetic field obtained by the reading of compass sensor is obtained through the following processes: data readings per each axis (X, Y, Z) and the magnitude of that vector calculated, or in alternative, only the value of one axis of the compass sensor is used.

In an embodiment, when the user flips the book page, comprises moving the magnet from the closest distance to the furthest away from the device compass sensor to provoke the maximum change on the magnetic field to change the information displayed on the device change.

It is also described non-transitory storage media including program instructions for implementing an interactive electronic system having a screen and a three-axis compass sensor for detecting flipping of pages of a book, the program instructions including instructions executable to carry out any of the described methods.

BRIEF DESCRIPTION OF DRAWINGS

The following figures provide preferred embodiments for illustrating the description and should not be seen as limiting the scope of disclosure.

DETAILED DESCRIPTION

The following embodiments are for illustrating the description and should not be seen as limiting the scope of the disclosure.

Figure 2:
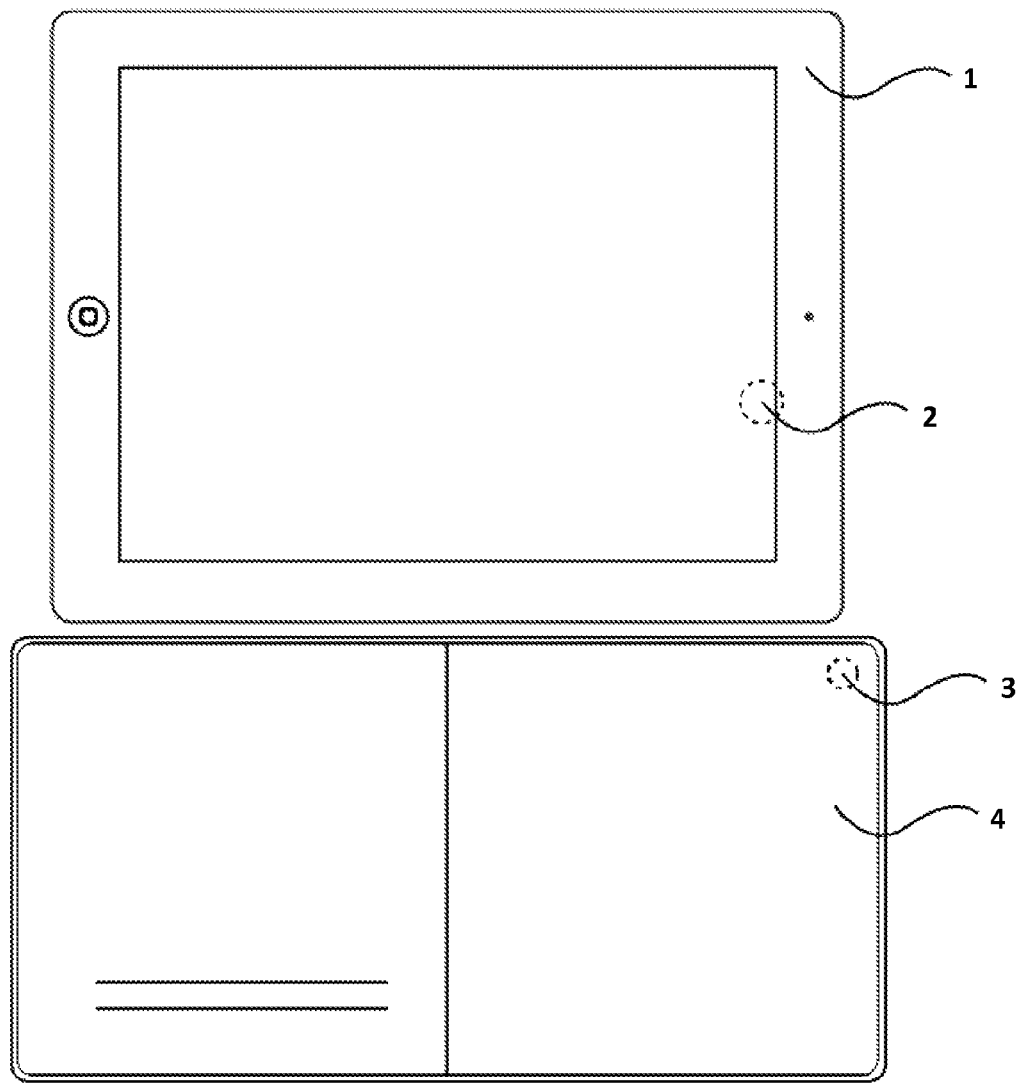
FIG. 2: Schematic representation of an embodiment of the disclosed system showing magnets, book and tablet location from a top view, wherein (1) represents a tablet device, (2) an approximate compass-sensor location, (3) a dissimulated magnet, and (4) a physical book.
Figure 3:
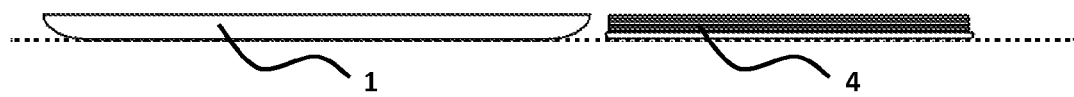
FIG. 3: Schematic representation of an embodiment of the disclosed system showing book and tablet location from a side view, wherein (1) represents a tablet device, and (4) a physical book.

In the proof-of-concept prototype developed, it was used an iPad™ tablet. Smartphones, tablets and other digital devices with a built-in digital compass could be employed. The iPad™ is used in landscape mode, (turning to the right), and the printed book is placed next to the device, in such way that the magnets, placed on the top-right of each book page are the closest to the device digital compass sensor (FIG. 2). In the current prototype the book pages have 1 mm thickness. The magnets are circular shape 6 mm in diameter and 1 mm thick. The magnets were placed on a circular cut-out on the pages, with the same diameter as the magnet, and covered with a printed-paper page. The layout of this prototype, as well as the approximate location of tablet digital-compass sensor and the magnets, can be seen in (FIGS. 2 and 3—Magnets, book and tablet location). In general, the book can be designed to be placed in different locations relative to the device: left, right, above, and even on top of the device if the book has see-through areas or occupies only part of the screen. Therefore, depending on the particular design, the best location for the magnets will vary. The position of the magnets on the page should be such that, when flipping the page, it makes the magnets to move from the closest distance to the device compass sensor to the furthest away from the sensor to provoke the maximum change on the magnetic field.

Figure 1:
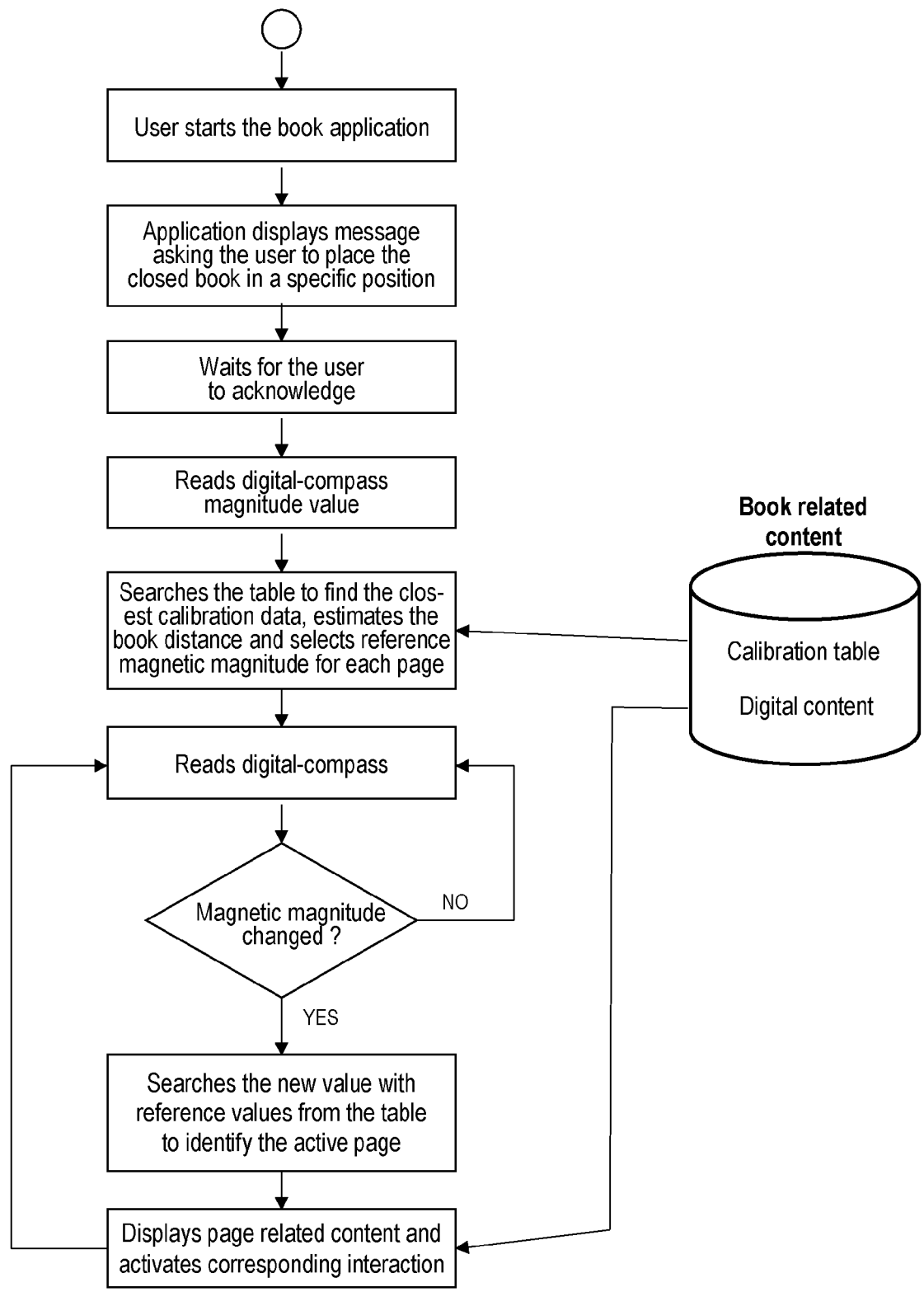
FIG. 1: Schematic representation of an embodiment of the disclosed process by which a device with a digital compass sensor detects on which page a book, with embedded magnets, is open in, and displays related digital content.

The present disclosure encompasses an algorithm to detect the page on which the book is open and displays corresponding content (FIG. 1). In the current prototype the algorithm was implemented for the iPad™ device. The software detects the page where a book is open by reading the strength of the magnetic field from the compass sensor induced by presence of the book magnets. A magnet with approximately 350 grams adhesion force was placed in the manner described previously. The software then displays digital content on the device related to the page detected.

Figure 4:
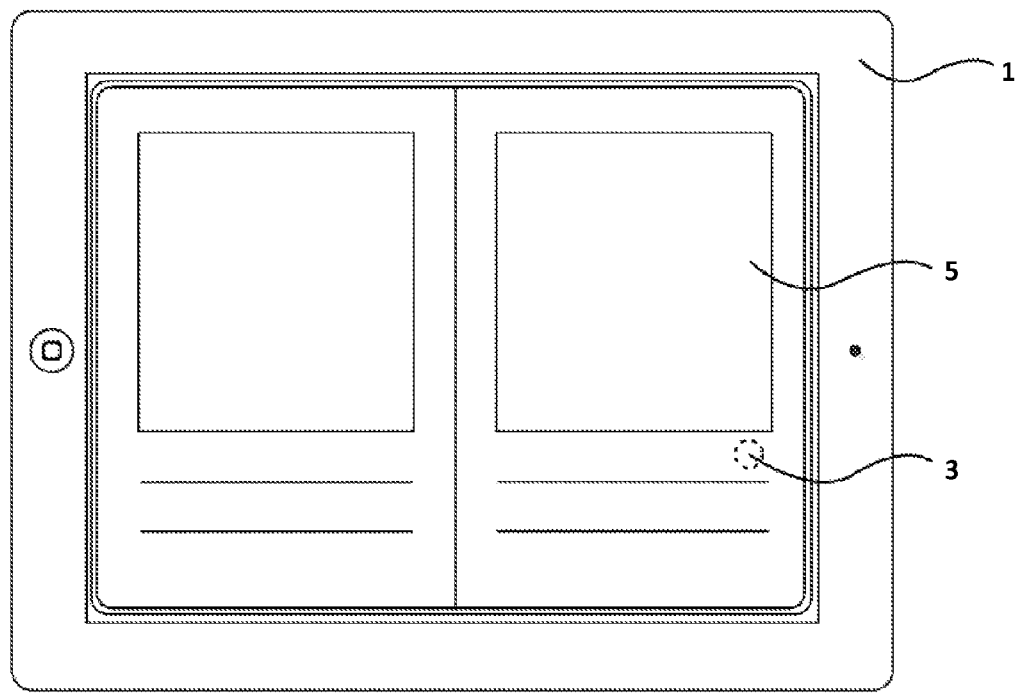
FIG. 4: Schematic representation of an embodiment of the disclosed system showing an alternative layout with magnets, book and tablet location from a top view, wherein (1) represents a tablet device, (5) a physical book with see-through hole to see the tablet display, and (3) a dissimulated magnet on the physical book.
Figure 5:
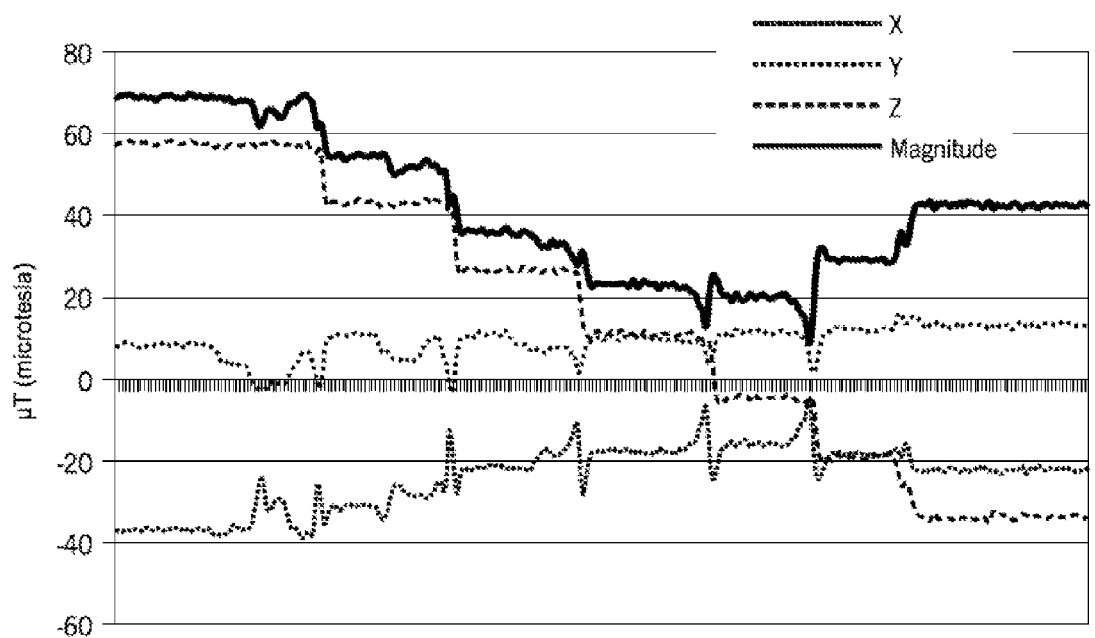
FIG. 5: Schematic representation of the data collected—measures of magnitude from each axis (X, Y and Z).
Figure 6:
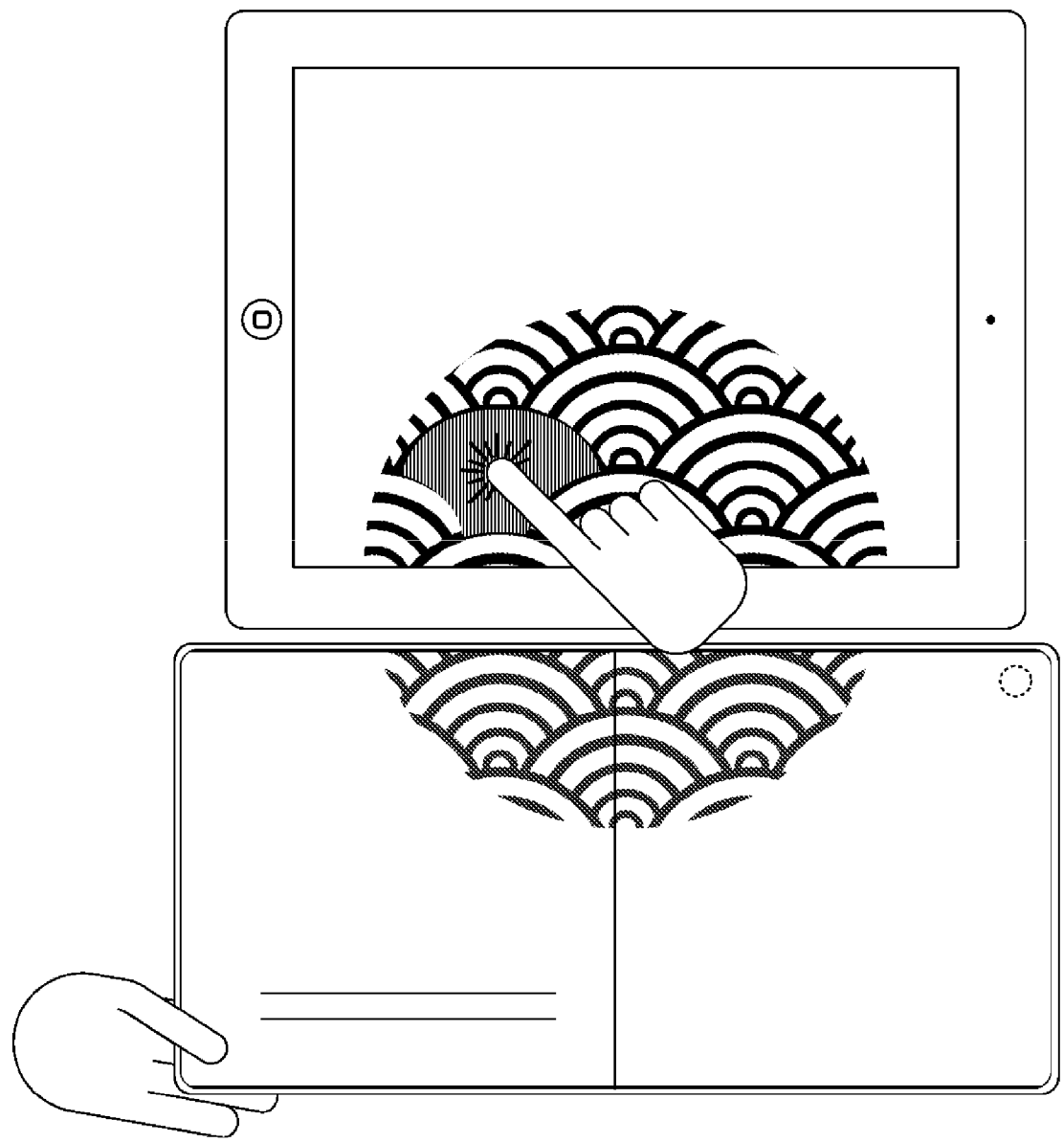
FIG. 6: Schematic representation of an embodiment of the disclosed system showing illustration and interaction illustrated scheme.

Flipping the physical book pages triggers the software to detect the new page and displays the corresponding digital content in synchronization. In the proof-of-concept prototype developed, and without lost of generalization of other applications that could be exploited, the device displays an image that completes the illustration of the opened page, in the manner shown in FIG. 4. Further, the software provides through the device, interaction, animation and sound with the digital content (FIG. 6—interaction and illustration illustrated scheme).

Since the technology only identifies the page the book is open and not the book itself, it is necessary for the users to select the corresponding book. A printed book would have available the corresponding application to be downloaded and installed on the device. The user starts the application corresponding to that book.

The disclosure presents a physical book with magnets that interfaces with a computational device with a compass-sensor so that a software running on the device detects the page in which the book is open. The software running on the device can trigger text, images, short animations, interactive elements, sound effects, or in general any digital content, in response to the open page of the physical book.

The disclosure presents numerous possibilities for applications as it constitutes a low-cost solution for a book to interface with a computational device, to detect which page of the book is open, without requiring active electronics, batteries, cables, or other expensive or cumbersome hardware. This allows each page of the physical book to be complemented by digital content displayed on the device. For instance a children's book can be read aloud by a smartphone or a tablet as the physical pages are flipped, or animations can be played on the device for each page of the story. For language learning, the device may display text and play sound in a foreign language as each page is flipped. In an example of other application, the software would ask children to read aloud the page or, in certain moments, ask to record how the story progresses. Parents and the children can go back to that book, flip the pages and hear those recordings through the device. In general the applications described, allow the device to offer rich-media content and interactions for each book page.

The term "comprising" whenever used in this document is intended to indicate the presence of stated features, integers, steps, components, but not to preclude the presence or addition of one or more other features, integers, steps, components or groups thereof.

Flow diagrams of particular embodiments of the presently disclosed methods are depicted in figures. The flow diagrams do not depict any particular means, rather the flow diagrams illustrate the functional information one of ordinary skill in the art requires to perform said methods required in accordance with the present disclosure.

It will be appreciated by those of ordinary skill in the art that unless otherwise indicated herein, the particular sequence of steps described is illustrative only and can be varied without departing from the disclosure. Thus, unless otherwise stated the steps described are so unordered meaning that, when possible, the steps can be performed in any convenient or desirable order.

It is to be appreciated that certain embodiments of the disclosure as described herein may be incorporated as code (e.g., a software algorithm or program) residing in firmware and/or on computer useable medium having control logic for enabling execution on a computer system having a computer processor, such as any of the servers described herein. Such a computer system typically includes memory storage configured to provide output from execution of the code which configures a processor in accordance with the execution. The code can be arranged as firmware or software, and can be organized as a set of modules, including the various modules and algorithms described herein, such as discrete code modules, function calls, procedure calls or objects in an object-oriented programming environment. If implemented using modules, the code can comprise a single module or a plurality of modules that operate in cooperation with one another to configure the machine in which it is executed to perform the associated functions, as described herein.

A disclosed embodiment for the system for displaying animation effects based on a book comprises a book having a plurality of pages with a magnet and an electronic device with a compass sensor.

In an embodiment, the magnet of the book is included inside each page.

In an embodiment, the number of magnets varies according to the number of pages that are to be identified by the application system, as some pages may not need to trigger detection, i.e. some pages may not have corresponding interactive content.

In an embodiment, the thickness of the magnets varies according to the thickness of the page.

In an embodiment, preferably the thickness of the magnet is 1 mm.

In an embodiment, the magnet location on the page should be such as to, when flipping the page, the magnet moves from the closest distance to the furthest away from the device compass sensor to provoke the maximum change on the magnetic field.

In an embodiment, the compass sensor of the device senses the change on the magnetic field when flipping the pages and the information that is presented on the devices also change.

In an embodiment, it is only used one magnet.

In an embodiment, the electronic device can be a tablet, or iPad™ or any device with a screen in particular a touch-screen.

A disclosed embodiment for the method of interaction between the system as previously described, comprises:
- downloading the software of the book to the electronic device;
- putting the book which contains the sensors in a predetermined area near the electronic device in manner to identify the pages;
- calibrating the system;
- obtaining the values of the magnitude of the magnetic field by the compass sensor of the electronic device to detect the page that is open;
- displaying the corresponding digital content in synchronization.

In an embodiment, the electronic device is in landscape and the book if above it.

In an embodiment, the calibration consists of reading a baseline value of the magnitude of the magnetic field and with previous recorded values of the compass-sensor readings for each page, for different distances which are included in the software and serve as reference values.

In an embodiment, the magnitude of the magnetic field obtained by the reading of compass sensor may be obtained through the following processes: data readings per each axis (X, Y, Z) and the magnitude of that vector calculated, or in alternative, for faster computation, only the value of one axis of the compass sensor is used.

In an embodiment, when the user flip the book page, the magnet moves from the closest distance to the furthest away from the device compass sensor to provoke the maximum change on the magnetic field and consequently the information displayed on the device change.

In an embodiment, the user interacts with the book story through the electronic device.

The disclosure is of course not in any way restricted to the embodiments described and a person with ordinary skill in the art will foresee many possibilities to modifications thereof.

The above described embodiments are obviously combinable.

The following dependent claims set out particular embodiments of the disclosure.

The invention claimed is:

1. An interactive electronic system having a screen and a three-axis, X, Y, or Z, compass sensor for detecting flipping of pages of a book,
wherein the book comprises a plurality of pages, each page having one or more magnets,
wherein the interactive electronic system is calibrated by reading a baseline value of a magnitude of a magnetic field by the three-axis compass sensor and including previously recorded values of the three-axis compass sensor readings for each page of the plurality of pages, for different distances, in software corresponding to the book to serve as reference values,
and wherein the interactive electronic system is arranged to detect the flipping of pages of the book by data readings of the value of one axis of the three axes, X, Y, or Z, or the magnitude of a calculated vector of the values of the three axes X, Y, and Z.

2. The interactive electronic system according to claim 1, wherein a location of a magnet on a book page is such as to, when flipping a book page, the magnet moves from a distance closest to the three-axis compass sensor to a distance furthest away from the three-axis compass sensor, in order to provoke a maximum change of magnetic field.

3. The interactive electronic system according to claim 1, wherein the one or more magnets are included within a thickness of each page.

4. The interactive electronic system according to claim 1, wherein the number of magnets corresponds to the number of pages that are to be identified by the interactive electronic system.

5. The interactive electronic system according to claim 1, wherein a thickness of the one or more magnets is the same as a thickness of each page.

6. The interactive electronic system according to claim 5, wherein the thickness of the one or more magnets is 1 mm.

7. The interactive electronic system according to claim 1, arranged such that when the three-axis compass sensor senses a change on the magnetic field of flipping a book page, information that is presented on the screen is also changed.

8. The interactive electronic system according to claim 1, wherein the interactive electronic system only uses one magnet.

9. The interactive electronic system according to claim 8, wherein the magnet is located on a back cover of the book, a front cover of the book, or any single page of the book.

10. The interactive electronic system according to claim 1, wherein the electronic system is a tablet or a device having a screen.

11. A method of operating an interactive electronic system having a screen and a three-axis compass sensor for detecting flipping of pages of a book, wherein the book comprises a plurality of pages, each page having one or more magnets, and wherein the interactive electronic system is arranged to detect a flipping of pages of the book by data readings of a value of one axis, X, Y, or Z, or a magnitude of a calculated vector of the values of the three axes X, Y, and Z, wherein said method comprises the steps of:
a) downloading a software corresponding to the book to an electronic device;
b) putting the book, which contains the one or more magnets, in a pre-determined area near the electronic device to identify the flipping of pages;
c) calibrating the system by reading a baseline value of a magnitude of a magnetic field by the compass three-axis sensor and including previously recorded values of the three-axis compass sensor readings for each page, for different distances, in the software to serve as reference values;
d) obtaining the values of the magnitude of the magnetic field by the three-axis compass sensor of the electronic device to detect which page of the book is open; and
e) displaying corresponding digital content in synchronization with the open page.

12. The method according to claim 11, wherein a position of the book is left, right, above or on top of the electronic device.

13. The method according to claim 11, wherein the electronic device is in landscape relative to a user and the book is above or below the electronic device.

14. The method according to claim 11, wherein the magnitude of the magnetic field obtained by the reading of the three-axis compass sensor is obtained through data readings per each axis (X, Y, Z) with the magnitude of that vector being calculated, or only the value of one axis of the three-axis compass sensor is used.

15. The method according to claim 11, further comprising moving the magnet when a user flips the book page from a distance closest to the three-axis sensor to a distance furthest away from the three-axis compass sensor to provoke the maximum change on the magnetic field to change the information displayed on the electronic device.

16. The method according to claim 11, wherein a user interacts with a book story through the electronic device.

17. Non-transitory storage media including program instructions for implementing an interactive electronic system having a screen and a three-axis compass sensor for detecting flipping of pages of a book, the program instructions including instructions executable to carry out the method of claim 11.

18. Non-transitory storage media including program instructions for implementing an interactive electronic system having a screen and a three-axis compass sensor for detecting flipping of pages of a book, the program instructions including instructions executable to carry out the method of claim 14.

* * * * *